United States Patent
Sun et al.

(10) Patent No.: US 8,164,900 B2
(45) Date of Patent: Apr. 24, 2012

(54) ENCLOSURE OF ELECTRONIC DEVICE

(75) Inventors: Hong-Zhi Sun, Shenzhen (CN); Chen Chen, Shenzhen (CN); Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 15 days.

(21) Appl. No.: 12/938,602

(22) Filed: Nov. 3, 2010

(65) Prior Publication Data

US 2011/0317363 A1    Dec. 29, 2011

(30) Foreign Application Priority Data

Jun. 25, 2010   (CN) .......................... 2010 1 0209927

(51) Int. Cl.
*H05K 7/20* (2006.01)
(52) U.S. Cl. ........................ 361/695; 361/694
(58) Field of Classification Search .................. None
See application file for complete search history.

(56) References Cited

U.S. PATENT DOCUMENTS

| | | | | |
|---|---|---|---|---|
| 6,025,989 A * | 2/2000 | Ayd et al. | ....................... | 361/695 |
| 6,297,950 B1 * | 10/2001 | Erwin | ....................... | 361/679.49 |
| 6,542,362 B2 * | 4/2003 | Lajara et al. | ............. | 361/679.48 |
| 7,012,815 B2 * | 3/2006 | Garnett et al. | ................ | 361/825 |
| 7,339,785 B2 * | 3/2008 | Colborn et al. | .......... | 361/679.33 |
| 7,486,513 B2 * | 2/2009 | Hall et al. | ....................... | 361/699 |
| 7,672,127 B2 * | 3/2010 | Hayashi | ....................... | 361/695 |
| 7,911,782 B2 * | 3/2011 | Attlesey et al. | .......... | 361/679.53 |
| 2004/0062002 A1 * | 4/2004 | Barringer et al. | ............. | 361/687 |

* cited by examiner

*Primary Examiner* — Gregory Thompson
(74) *Attorney, Agent, or Firm* — Altis Law Group, Inc.

(57) ABSTRACT

An enclosure of an electronic device includes a bottom plate, a rear plate connected to the bottom plate, and a power supply unit. A heat generation apparatus is located on the bottom plate. An opening is defined in the rear plate. A power supply unit includes a wide first receiver portion and a narrow second receiver portion. A fan is mounted in the wide first receiver portion. The wide first receiver portion includes a rear wall located in the opening and a first front wall that is parallel to the rear wall. The first front wall and the rear wall define vent holes. The narrow second receiver portion includes a second side wall perpendicular to the first front wall. The second side wall and the heat generation apparatus form an air flow channel therebetween. The fan drives air flow through the air flow channel.

13 Claims, 3 Drawing Sheets

ENCLOSURE OF ELECTRONIC DEVICE

BACKGROUND

1. Technical Field

The present disclosure relates to enclosures of electronic devices, more particularly to an enclosure of an electronic device capable of dissipating heat efficiently.

2. Description of Related Art

Various electrical instruments nowadays, and especially the desktop computers, are crowded with different electrical components and peripheral devices, such as central processing units (CPUs), interface cards, data storage devices, and power supplies. These electrical components and peripheral devices generate heat during operation. The inner temperature of the desktop computer enclosure can become very high. Therefore, one or more heat dissipation devices, such as fans, are installed inside the computer chassis to remove the heat generated by the electrical components and peripheral devices, to ensure that the inside of the computer chassis maintains a moderate operating temperature. However, because the electrical instruments are crowded together in a relatively small space, even with the fans, airflow may be severely restricted and therefore effectiveness of the enclosure to dissipate heat is restricted as well.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
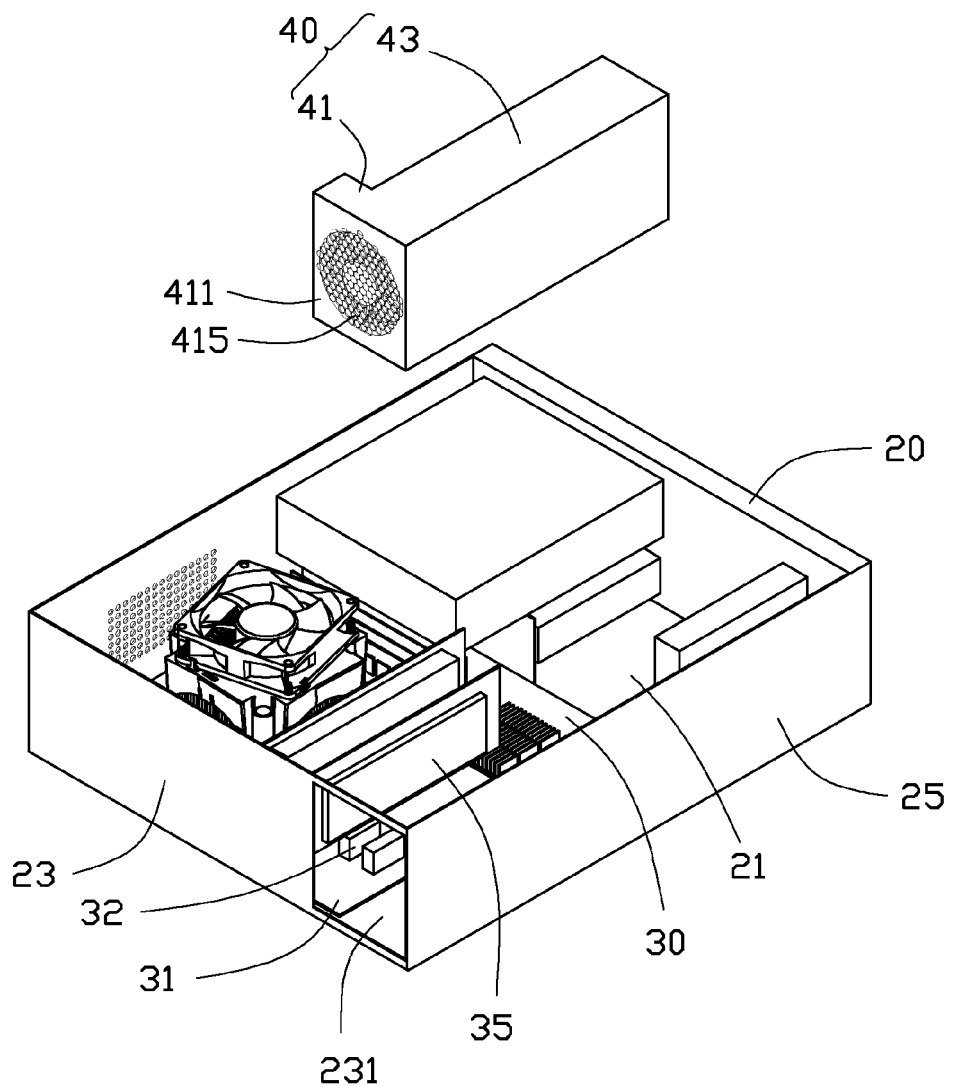
FIG. 1 is an isometric and exploded view of an enclosure of an electronic device in accordance with an embodiment.

Referring to FIG. 1, an enclosure of an electronic device in accordance with an embodiment includes a chassis 20, a motherboard 30, and a power supply unit 40.

The chassis 20 includes a bottom plate 21, a rear plate 23, and a side plate 25. The rear plate 23 and side plate 25 extends perpendicularly from two adjacent edges of the bottom plate 21. The rear plate 23 and side plate 25 are perpendicular to each other. The rear plate 23 defines an opening 231 in a portion adjacent the side plate 25.

The motherboard 30 is secured onto the bottom plate 21. An edge 31 of the motherboard 30 abuts the rear plate 23. A length of the edge 31 is smaller than that of the rear plate 23. The portion defining the opening 231 of the rear plate 23 is not aligned with the edge 31 of the motherboard 30. The motherboard 30 has a number of slot connectors 32 mounted thereon. The number of slot connectors 32 is aligned along a direction perpendicular to the rear plate 23. The number of slot connectors 32 are adjacent the opening 231. An expansion card 35 is mounted in one slot connector 32 of the plurality of slot connectors 32. The expansion card 35 is adjacent the opening 231 and aligned in a direction perpendicular to the rear plate 23. The expansion card 35 generates substantial heat when the expansion card 35 works.

Figure 2:
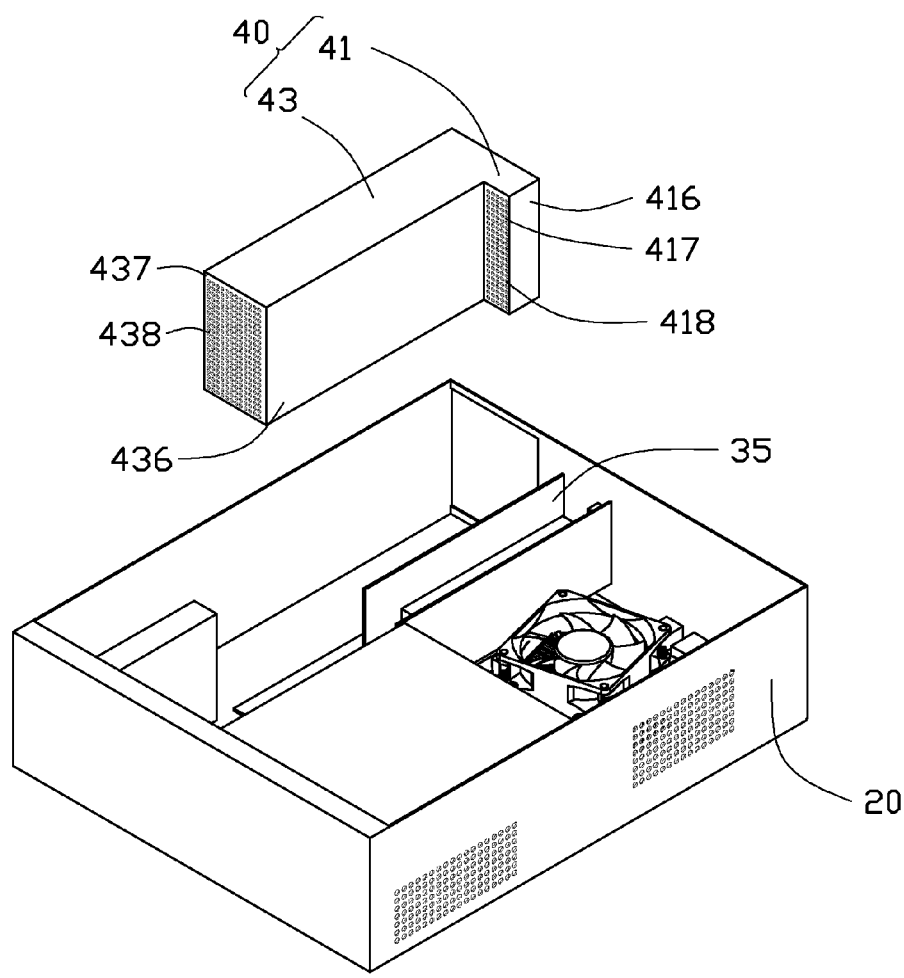
FIG. 2 is similar to FIG. 1, but viewed from another aspect.

Referring to FIGS. 1 and 2, the power supply units 40 is generally "L" shape, and includes a wide first receiver portion 41 and a narrow second receiver portion 43. The second receiver portion 43 extends in a direction distal from the first receiver portion 41. The first receiver portion 41 has a fan (not shown) mounted therein. A plurality of electronic components (not shown) is mounted in the second receiver portion 43. The first receiver portion 41 includes a rear wall 411, a first front wall 417, a first side wall 416. The rear wall 411 and the first front wall 417 are parallel to each other. The first side wall 416 is perpendicular to the rear wall 411 and the first front wall 417. A size of the rear wall 411 is equal to that of the opening 231 of the rear plate 23. A plurality of third vent holes 415 is defined in the rear wall 411. The first front wall 417 defines a plurality of first vent holes 418 therein.

The second receiver portion 43 has a second front wall 437 and a second side wall 436. The second front wall 437 is parallel to the first front wall 417. The first and second front walls 417, 437 are located on different planes. The second side wall 436 is parallel to the first side wall 416. The first and second side walls 416, 436 are located on different planes. A plurality of second vent holes 438 is defined in the second front wall 437. An area of the rear wall 411 is equal to a total area of the first front wall 417 and the second front wall 437.

Figure 3:
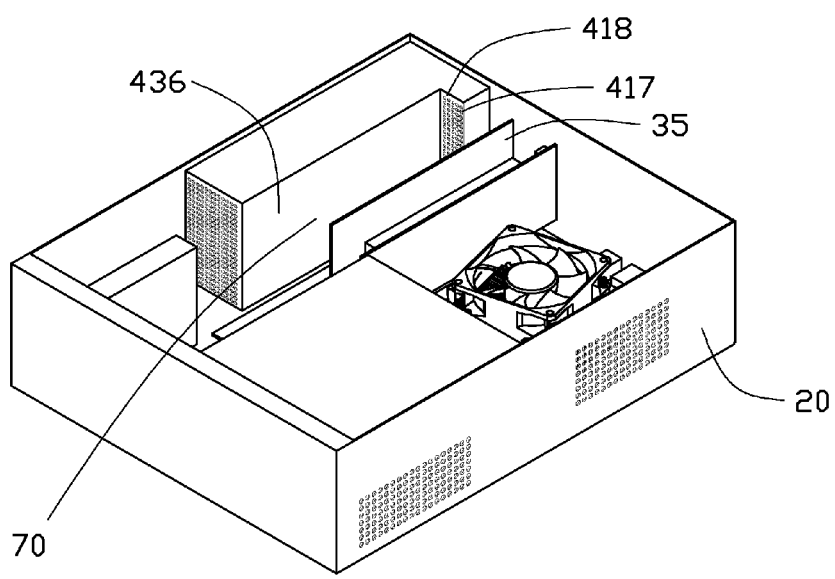
FIG. 3 is an assembled view of the enclosure of FIG. 1.

Referring to FIGS. 1 to 3, in assembly of the enclosure, the power supply unit 40 is positioned in the chassis 20 with the rear wall 411 placed in the opening 231. In this position, the second side wall 436 is directed towards the expansion card 35. An air flow channel 70 is defined between the expansion card 35 and the second side wall 436. The first front wall 417 of the power supply unit 40 is located in the air flow channel 70. When the fan in the first receiver portion 41 rotates, the fan drives air flow through the air flow channel 70, the first vent holes 418, and the third vent holes 415 to dissipate heat of expansion card 35. Simultaneously, the fan drives air flow through the second vent holes 438, an inner of the second receiver portion 43, and the third vent holes 415 to dissipated heat of the power supply unit 40.

In some embodiments, according to the shape of the power supply unit 40, the fan in the power supply unit 40 can both dissipate heat from the power supply unit 40 and the expansion card 35. Further, the expansion card 35 of some embodiments can be replaced by any other heat generation apparatuses.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An enclosure of an electronic device, comprising:
    a bottom plate, a heat generation apparatus located on the bottom plate;
    a rear plate connected to the bottom plate, an opening defined in the rear plate; and
    a power supply unit comprising a wide first receiver portion and a narrow second receiver portion; a fan mounted in the wide first receiver portion, the wide first receiver portion comprising a rear wall located in the opening and a first front wall, which is parallel to the rear wall, the first front wall defining a plurality of first vent holes, and the rear wall defining a plurality of third vent holes; the narrow second receiver portion comprising a second side wall, which is perpendicular to the first front wall; an air flow channel defined between the second side wall and the heat generation apparatus; the first front wall is located in the air flow channel; wherein the fan is configured to drive air flow through the air flow channel.

2. The enclosure of claim 1, wherein a size of the rear wall is equal to that of the opening.

3. The enclosure of claim 1, wherein the narrow second receiver portion further comprises a second front wall that is parallel to the first front wall, and the first front wall and the second front wall are located in different planes.

4. The enclosure of claim 3, wherein an area of the rear wall is equal to a total area of the first front wall and the second front wall.

5. The enclosure of claim 3, wherein the second front wall defines a plurality of second vent holes, and the fan is configured to drive air flow through the plurality of second vent holes and the plurality of third vent holes.

6. The enclosure of claim 1, wherein the power supply unit is generally "L" shape.

7. The enclosure of claim 1, wherein the heat generation apparatus is located perpendicular to the rear wall, and the second side wall is perpendicular to the rear wall.

8. An enclosure of an electronic device, comprising:
a bottom plate and a rear plate perpendicularly connected to the bottom plate, a motherboard secured on the bottom plate, the motherboard comprising a slot connector, an expansion card mounted on the slot connector and located along a direction perpendicular to the rear plate, the rear plate defining an opening adjacent the expansion card; and a power supply unit mounted on the bottom plate, the power supply unit comprising a first receiver portion and a second receiver portion extending from part of the first receiver portion, a fan mounted in the first receiver portion, the first receiver portion comprising a rear wall located in the opening and a first front wall that is parallel to the rear wall, the first front wall defining a plurality of first vent holes, the rear wall defining a plurality of third vent holes; the second receiver portion comprising a second side wall perpendicularly connected to the first front wall; the second side wall and the expansion card forming an air flow channel that is perpendicular to the first front wall;

wherein the fan is configured to drive air flow through the air flow channel, the plurality of first vent holes of the first front wall, and the plurality of third vent holes of the rear wall to dissipate heat of the expansion card.

9. The enclosure of claim 8, wherein a size of the rear wall is equal to that of the opening.

10. The enclosure of claim 8, wherein the second receiver portion further comprises a second front wall that is parallel to the first front wall, and the first and second front walls are located in different planes.

11. The enclosure of claim 10, wherein an area of the rear wall is equal to a total area of the first front wall and the second front wall.

12. The enclosure of claim 10, wherein the second front wall defines a plurality of second vent holes, and the fan is configured to drive air flow through the plurality of second vent holes and the plurality of third vent holes.

13. The enclosure of claim 8, wherein the power supply unit is generally "L" shape.

* * * * *